(12) United States Patent
Zhi et al.

(10) Patent No.: US 9,301,202 B2
(45) Date of Patent: Mar. 29, 2016

(54) METHOD AND SYSTEM FOR CONTROLLING ACCESS TO SHARED NETWORK

(75) Inventors: Chunxia Zhi, Shenzhen (CN); Yun Deng, Shenzhen (CN); Baoguo Xie, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 173 days.

(21) Appl. No.: 13/985,373

(22) PCT Filed: Jan. 16, 2012

(86) PCT No.: PCT/CN2012/070433
§ 371 (c)(1),
(2), (4) Date: Aug. 14, 2013

(87) PCT Pub. No.: WO2012/109951
PCT Pub. Date: Aug. 23, 2012

(65) Prior Publication Data
US 2013/0322239 A1 Dec. 5, 2013

(30) Foreign Application Priority Data
Feb. 14, 2011 (CN) .......................... 2011 1 0037367

(51) Int. Cl.
*H04J 1/16* (2006.01)
*H04J 3/14* (2006.01)
(Continued)

(52) U.S. Cl.
CPC .......... *H04W 28/10* (2013.01); *H04W 28/0247* (2013.01); *H04W 28/08* (2013.01); *H04W 74/00* (2013.01); *H04W 92/02* (2013.01)

(58) Field of Classification Search
CPC . H04W 28/10; H04W 28/0247; H04W 28/08; H04W 92/02; H04W 28/02; H04W 48/06; H04L 49/50; H04L 49/501
See application file for complete search history.

(56) References Cited

U.S. PATENT DOCUMENTS 8,331,224 B2 * 12/2012 Meirosu ............... H04W 28/08
370/229
8,428,610 B2 * 4/2013 Chowdhury ........ H04L 12/5695
370/329

(Continued)

FOREIGN PATENT DOCUMENTS

CN 1756405 A 4/2006
CN 1852588 A 10/2006
(Continued)

OTHER PUBLICATIONS

International Search Report in international application No. PCT/CN2012/070433 mailed on Apr. 26, 2012. (2 pages).
(Continued)

*Primary Examiner* — Brian O'Connor
(74) *Attorney, Agent, or Firm* — Oppedahl Patent Law Firm LLC

(57) ABSTRACT

The disclosure discloses a method and system for controlling access to a shared network. In both the method and the system, a core network node may send an overload indicator capable of distinguishing PLMNs to an access network node when the core network node is overloaded; and the access network node may learn a PLMN over which access control needs to be performed according to the overload indicator received. The method and the system of the disclosure distinguish the PLMNs in performing access control according to an actual situation of overload of the network node caused by a PLMN sharing the network, ensuring the fairness in performing access control over terminals of all PLMNs sharing the network. Therefore, the problem of unfairness in performing access control over terminals of different PLMNs in a network sharing scenario is solved.

8 Claims, 8 Drawing Sheets

```
     ┌─ 1001
┌────────────────────────────────────────────────────────────┐
│ An overload indicator capable of distinguishing PLMNs is sent to an │
│  access network node when a core network node in a shared  │
│                   network is overloaded                    │
└────────────────────────────────────────────────────────────┘
                              │
                              ▼
     ┌─ 1002
┌────────────────────────────────────────────────────────────┐
│ The access network node learns a PLMN over which access control │
│ needs to be performed according to the overload indicator received │
└────────────────────────────────────────────────────────────┘
```

(51) Int. Cl.
 *H04W 28/10* (2009.01)
 *H04W 28/08* (2009.01)
 *H04W 28/02* (2009.01)
 *H04W 74/00* (2009.01)
 *H04W 92/02* (2009.01)

(56) References Cited

U.S. PATENT DOCUMENTS

| | | | | |
|---|---|---|---|---|
| 8,504,055 | B2* | 8/2013 | Vikberg | H04W 28/08 370/331 |
| 8,611,280 | B2* | 12/2013 | Morera et al. | 370/328 |
| 8,660,009 | B2* | 2/2014 | Dahlen | H04W 48/06 370/237 |
| 8,908,619 | B2* | 12/2014 | Lee et al. | 370/329 |
| 8,995,262 | B2* | 3/2015 | Chowdhury | H04L 12/5695 370/230 |
| 9,001,655 | B2* | 4/2015 | Watfa et al. | 370/235 |
| 2006/0073831 | A1 | 4/2006 | Guyot et al. | |
| 2011/0058480 | A1* | 3/2011 | Dahlen | 370/237 |
| 2012/0082099 | A1* | 4/2012 | Bienas et al. | 370/329 |
| 2014/0056134 | A1* | 2/2014 | Koskinen et al. | 370/230 |

FOREIGN PATENT DOCUMENTS

| | | |
|---|---|---|
| CN | 101060698 A | 10/2007 |
| CN | 101061738 A | 10/2007 |
| CN | 101193394 A | 6/2008 |
| CN | 101730033 A | 6/2010 |
| CN | 101742415 A | 6/2010 |
| CN | 101801022 A | 8/2010 |
| CN | 101959133 A | 1/2011 |
| JP | 2010268249 A | 11/2010 |
| WO | 2008048158 A1 | 4/2008 |
| WO | 2009096833 A1 | 8/2009 |
| WO | 2010080056 A1 | 7/2010 |
| WO | 2013023608 A1 | 2/2013 |

OTHER PUBLICATIONS

English Translation of the Written Opinion of the International Search Authority in international application No. PCT/CN2012/070433 mailed on Apr. 26, 2012. (8 pages).

Alcatel-Lucent, "Discussion in MTC requirements and ACB", 3GPP TSG-RAN WG2 Meeting #72, R2-106429, Nov. 19, 2010. (3 pages—see entire document).

* cited by examiner

METHOD AND SYSTEM FOR CONTROLLING ACCESS TO SHARED NETWORK

TECHNICAL FIELD

The disclosure relates to the field of communications, and in particular to a method and a system for controlling access to a shared network.

BACKGROUND

Along with the development of mobile network services and automatic control technologies, a machine type communication mode, also referred to as a Machine to Machine (M2M) communication mode, has appeared. In this communication mode, at least one party involved in the communication is a machine device.

A narrow definition of the M2M is machine to machine communication, but in a broad sense, the M2M includes networked applications and services centred on intelligent interactions of a machine terminal. The M2M is based on an intelligent machine terminal, and may provide a user an information-based solution using a plurality of communication modes as access means to satisfy an information-based demand of the user for aspects such as monitoring, commanding and scheduling, data collection and measurement. The M2M may be applied to industry applications, household applications, personal applications and the like.

An object to which the M2M communication is directed is a machine, and communication behaviours are controlled automatically, that is, initiation and termination of the communication and control over some admittances and limitations during the communication are all automatic behaviours. Such behaviours depend on restriction and control of behaviours of the machine (i.e., the terminal in M2M communication) in the M2M communication. Behaviours of the terminal in the M2M communication are restricted by service subscription data, and a network manages the terminal in the M2M communication according to the service subscription data.

The most typical communication mode in the machine type communication is communication between the terminal and an application server, wherein the terminal is referred to as an MTC device, and the application server is referred to as an MTC server.

In the case of 2G/3G/LTE access, the M2M communication mainly uses a Packet Service (PS) network as an underlying bearer network to implement service layer communication between the MTC device and the MTC server. FIG. 1 is a schematic diagram of the architecture for an M2M communication entity to access an Evolved Packet System (EPS) according to a relevant art. As shown in FIG. 1, the underlying bearer network includes: an Evolved Universal Terrestrial Radio Access Network (E-UTRAN), a Mobility Management Entity (MME), a Serving Gateway (S-GW or SGW), a Packet Data Network Gateway (PDN GW, or P-GW, or PGW), a Home Subscriber Server (HSS), and a Policy and Charging Rules Function (PCRF) entity. Wherein, a main network element of the E-UTRAN is an evolved base station (Evolved NodeB, eNodeB, or eNB).

In FIG. 1, the MME is in charge of work related to a control plane such as mobility management, processing of non-access-layer signalling, and context management in user mobility management and the like. The S-GW is an access gateway device connected with the E-UTRAN, and is in charge of forwarding data between the E-UTRAN and the P-GW, and caching paging-waiting data. The P-GW is a border gateway of the EPS and a Packet Data Network (PDN), and is in charge of functions such as access of the PDN, and data forwarding between the EPS and the PDN. The PCRF is the Policy and Charging Rules Function entity, and is connected with an operator Internet Protocol (IP) service network via a receiving interface Rx to acquire service information, and the PCRF may also be connected with a gateway device in the network via a Gx interface, and is in charge of initiating IP bearer establishment, ensuring Quality of Service (QoS) of service data, and performing charging control. The HHS is used for managing subscription data of the user, and managing important context information of the user when accessing the network.

In addition, the MTC server may play the role of an Application Function (AF), and may be connected with the PCRF via the interface Rx to implement control over the bearer. Furthermore, the MTC server may play the role of an SIP AS, and may be connected with the HSS via an Sh interface to access application service data.

In FIG. 1, an MTC UE accesses an EPS network via the E-UTRAN (eNodeB). After being allocated with an IP address, the MTC UE may establish an IP channel with the MTC server, so as to implement upper-layer service communication with the MTC server. The IP channel established between the MTC UE and the MTC server is a logical IP channel.

At present, one way of implementing the M2M communication is to establish, on the IP channel between the MTC UE and the MTC server, a service layer interface protocol, through which the MTC UE server performs service data interaction with the MTC server, and the MTC server also implements control over the MTC UE.

Data communication between the MTC UE and the MTC server may be implemented via IP connection between the MTC UE and the MTC server. However, a demand for MTC monitoring is hard to be implemented on the IP connection: the MTC server needs to monitor an operational state of the MTC UE and dynamically learn the current state of the MTC UE in time, and when there is a change in the current state of the MTC UE, the MTC server needs to be informed timely. These changes in the state of the MTC UE may include: attachment of the MTC UE from the network, entering of the MTC UE into a non-connection state, releasing of a wireless connection by the MTC UE, and a change in the current location of the MTC UE. These changes in the state of the MTC UE may be referred to as MTC events. An MTC event to be monitored may generally be defined in MTC subscription data of an HLR/HSS, and be issued to a Serving GPRS Support Node (SGSN)/MME by the HLR/HSS through a flow of attachment of the MTC UE to the network. And detection of the MTC event generally needs to be performed by a network entity of a core network. For example, in the EPS network, a network element in charge of detecting the MTC event may be the MME/SGW/PGW or the like; and in a GPRS network, the network element in charge of detecting the MTC event may be the SGSN/GGSN and the like. When detected, the MTC event generally needs to be reported to the MTC server, so that the MTC server learns the operational status of the MTC UE in time.

Network sharing may provide a capability of sharing a same network node by Public Land Mobile Networks (PLMN) of multiple operators, avoid repeated network construction in a same area, and save network construction costs of the operators. In the shared network, an overloaded core network node sends an overload message to an access network node. After receiving the overload message, the access network node will not select the core network node as a serving node for the terminal, but select another useable network node instead. If there is no useable network node, the access network node will reject an access request of the terminal, or broadcast an Access Class Barring (ACB) parameter. When a load of the core network node becomes normal, the core network node sends an overload ending message to the access network node, which may then continue to select the core network node as the serving node for the terminal. However, the above technology does not distinguish the PLMNs in performing access control, and the terminal of an operator that does not cause overload of a shared network node is also treated in the same way, failing to ensure a fair access control over terminals of all PLMNs sharing the network.

SUMMARY

In view of this, the main purpose of the disclosure is to provide a method and system for controlling access to a shared network, to distinguish PLMNs in performing access control, so as to ensure a fair access control over all terminals sharing the network.

In order to achieve the above purpose, the technical solution of the disclosure is implemented as follows.

A method for controlling access to a shared network, includes:

receiving, by an access network node, an overload indicator capable of distinguishing Public Land Mobile Networks (PLMN); and learning, by the access network node, a PLMN over which access control needs to be performed according to the overload indicator received.

Wherein, the receiving, by an access network node, an overload indicator capable of distinguishing Public Land Mobile Networks (PLMN) may be:

receiving, by the access network node, the overload indicator capable of distinguishing PLMNs directly from a core network node, when the core network node is overloaded; or receiving, by the access network node, the overload indicator capable of distinguishing PLMNs via an operation and maintenance system, when a core network node is overloaded.

Wherein, the receiving, by an access network node, an overload indicator capable of distinguishing Public Land Mobile Networks (PLMN) may be: receiving, by the access network node, an overload message including a PLMN identifier.

Wherein, the access network node may perform access control in one of the following two modes:

Mode 1: formulating, by the access network node, an Extended Access Barring (EAB) parameter corresponding to each PLMN over which access control needs to be performed, and sending EAB parameters corresponding to respective PLMNs to a terminal in a broadcast message; and Mode 2: acquiring, by the access network node, a PLMN identifier selected by a terminal from a message sent by the terminal, and rejecting a connection establishment request of the terminal or releasing an established connection of the terminal when the PLMN identifier is the identifier of the PLMN over which access control needs to be performed currently.

The method may further include: receiving, by the access network node, an overload stop message carrying an identifier of the PLMN for which access control needs to be stopped, when an overload of a core network node terminates.

An access network node for controlling access to a shared network is configured to receive an overload indicator capable of distinguishing Public Land Mobile Networks (PLMN); and learn a PLMN over which access control needs to be performed according to the overload indicator received.

Wherein, the overload indicator may be received directly from a core network node, when the core network node is overloaded, or may be received via an operation and maintenance system, when a core network node is overloaded.

Wherein, the overload indicator may be an overload message including a PLMN identifier.

Wherein, the access network node may be configured to perform access control in one of the following two modes:

Mode 1: the access network node formulates an Extended Access Barring (EAB) parameter corresponding to each PLMN over which access control needs to be performed, and sends EAB parameters corresponding to respective PLMNs to a terminal in a broadcast message; and Mode 2: the access network node acquires a PLMN identifier selected by a terminal from a message sent by the terminal, and rejects a connection establishment request of the terminal or releases an established connection of the terminal when the PLMN identifier is the identifier of the PLMN over which access control needs to be performed currently.

The access network node may be further configured to receive, an overload stop message carrying an identifier of the PLMN for which access control needs to be stooped, when an overload of a core network node terminates.

A core network node for controlling access to a shared network is configured to send an overload indicator capable of distinguishing Public Land Mobile Networks (PLMN) to an access network node when the core network node is overloaded, so that the access network node can learn a PLMN over which access control needs to be performed according to the overload indicator.

Wherein, the overload indicator may be an overload message including a PLMN identifier.

The core network node may be further configured to, before sending the overload indicator, determine the PLMN over which access control needs to be performed according to a current load status.

The core network node may be further configured to, when an overload of the core network node terminates, send the access network node an overload stop message carrying an identifier of the PLMN over which access control needs to be stopped.

The method and the system of the disclosure distinguish the PLMNs in performing access control according to an actual situation of overload of the network node caused by a PLMN sharing the network, ensuring the fairness in performing access control all terminals sharing the network. Therefore, the problem of unfairness in performing access control over terminals of different PLMNs in a network sharing scenario is solved.

DETAILED DESCRIPTION

Figure 1:
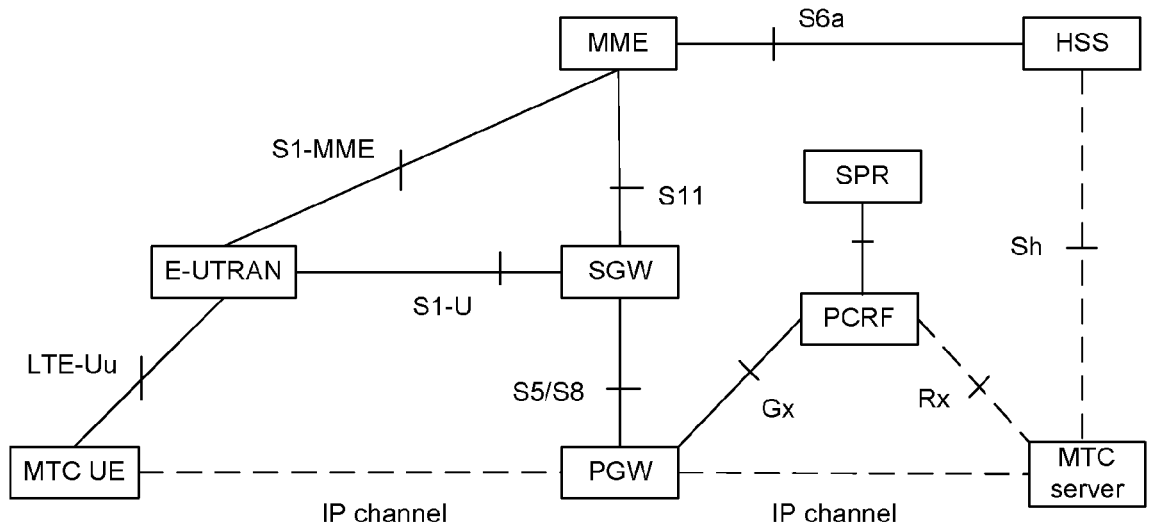
FIG. 1 is the diagram of an architecture of an M2M network.

Generally speaking, when an overload of a core network node in a shared network occurs, an overload message may be sent to an access network node. If the core network node is shared by multiple PLMNs, then it is required to first judge which PLMNs cause the overload of the core network node or loads of which PLMNs exceed a predefined threshold, and to carry a PLMN identifier in the overload message and optionally carry another access control parameter (such as an access control type, a waiting time length and the like).

After receiving the overload message, the access network node learns the PLMNs over which access control needs to be performed according to the PLMN identifier in the overload message.

The access network node may perform access control in the following two modes:

Mode 1: the access network node formulates a corresponding EAB parameter respectively for each of the PLMNs over which access control need to be performed, and sends the EAB parameter corresponding to the PLMN to the terminal in a broadcast message. If another access control parameter, such as the access control type, the waiting time length and the like, is carried in the overload message sent by the core network node, then the access network node further needs to refer to such information sent by a core network when formulating the EAB parameter.

Mode 2: the access network node acquires a PLMN identifier selected by the terminal from a message related to connection establishment or other messages sent by the terminal, and when the PLMN identifier is the identifier of the PLMN over which access control needs to be performed currently, the access network node rejects a connection establishment request of the terminal or releases an established connection of the terminal. If another access control parameter, such as the access control type, the waiting time length and the like, is carried in the overload message sent by the core network node, then the access network node further needs to refer to such information sent by the core network when rejecting or releasing a wireless connection of the terminal. In addition, an access control parameter, such as a waiting time and the like, may be carried in a terminal-wireless-connection-rejecting-or-releasing message.

An overload status of the core network node may also be monitored by an O&M (operation and maintenance) system. For example, a load threshold of a shared network node is preset in the O&M, and when monitoring that the load of the core network node reaches the threshold, the O&M sends the access network node the overload message carrying the identifier of the PLMN over which access control needs to be performed and other relevant parameters. After the access network node receives the overload message, the subsequent processing is the same as the corresponding technical content mentioned above. The load threshold may be set as the threshold of the load of the whole node, or different thresholds may be set according to PLMNs respectively.

When the overload of the core network node in the shared network has terminated, the core network node sends an overload stop message to the access network node. If the core network node is shared by multiple PLMNs, then an identifier of the PLMN over which access control is to be stopped needs to be carried in the overload stop message. After receiving the overload stop message, the access network node stops the access control over the corresponding terminal.

Note that in a specific operation, the shared core network node determines the PLMN over which access control needs to be performed according to the current load status. The shared core network node carries the identifier of the PLMN over which access control needs to be performed in the overload message sent to a shared access network node. The shared access network node formulates the EAB parameter respectively for each PLMN over which access control needs to be performed, and sends the EAB parameter to the terminal in the broadcast message. The shared access network node stores the identifier of the PLMN over which access control needs to be performed, and releases the wireless connection initiated subsequently of the terminal of the PLMN over which access control is required. When the overload of the shared core network node terminates, the shared core network node sends the shared access network node the overload stop message carrying the identifier of the PLMN over which access control needs to be stopped.

The disclosure is elaborated below with reference to the figures and embodiments.

Figure 2:
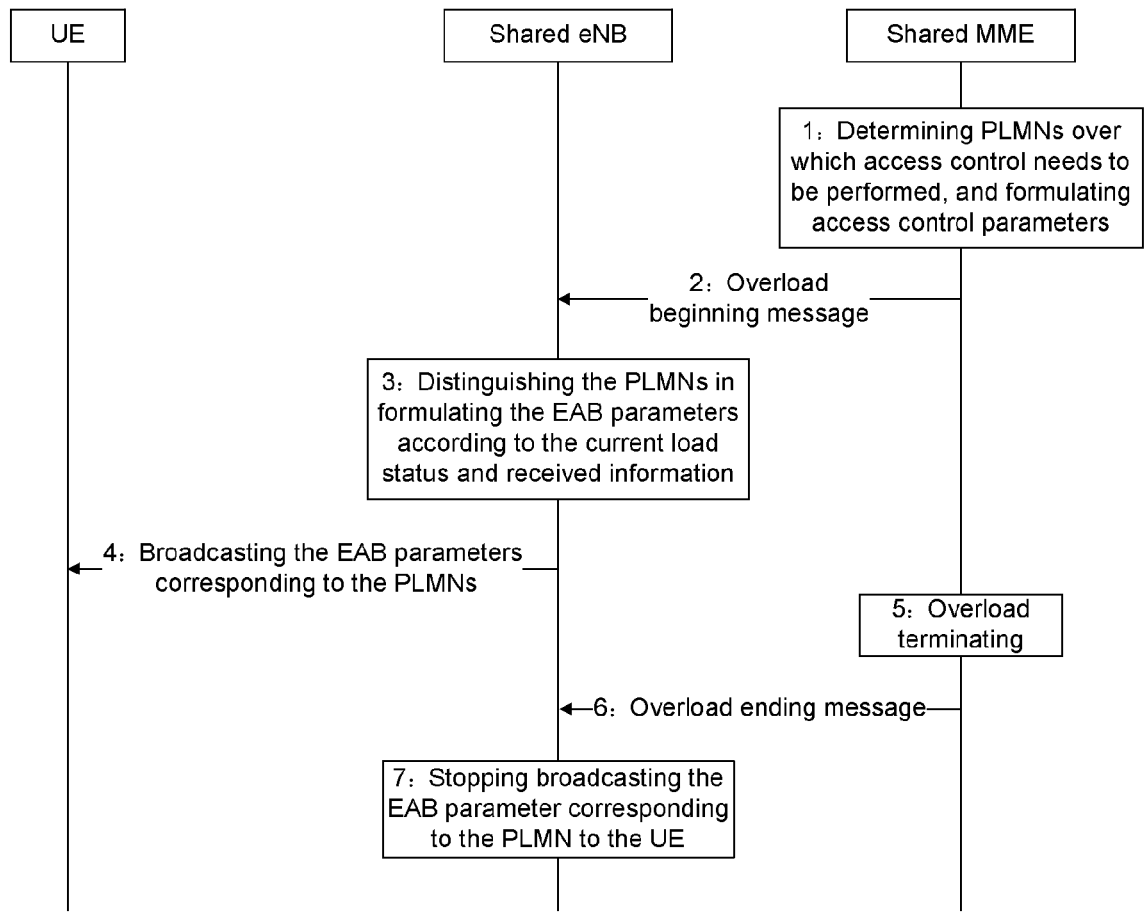
FIG. 2 is one flowchart of performing access control by a shared eNB using an extended access barring (EAB) mechanism in an EPS shared network according to an embodiment of the disclosure.

A scenario where both the core network and an access network are shared Embodiment 1:

As shown in FIG. 2, a specific implementation flow of performing access control by a shared eNB using an EAB mechanism in an EPS shared network is as follows:

1. When a shared MME is overloaded, the shared MME determines PLMNs over which access control needs to be performed, and optionally formulates corresponding access control parameters;

2. the shared MME sends the shared eNB an overload beginning message carrying the identifiers of the PLMNs over which access control needs to be performed and the corresponding access control parameters (optional);

3. the shared eNB formulates a corresponding EAB parameter for each of the PLMNs over which access control needs to be performed according to the current load status and received information;

4. the shared eNB broadcasts the EAB parameters corresponding to the PLMNs over which access control needs to be performed to the UE;

5. the overload status of the shared MME terminates, and a load thereof returns to normal;

6. the shared MME sends the shared eNB an overload ending message carrying the identifier of a PLMN over which access control is to be stopped; and 7. the shared eNB stops broadcasting the EAB parameter corresponding to the PLMN to the UE.

Embodiment 2

Figure 3:
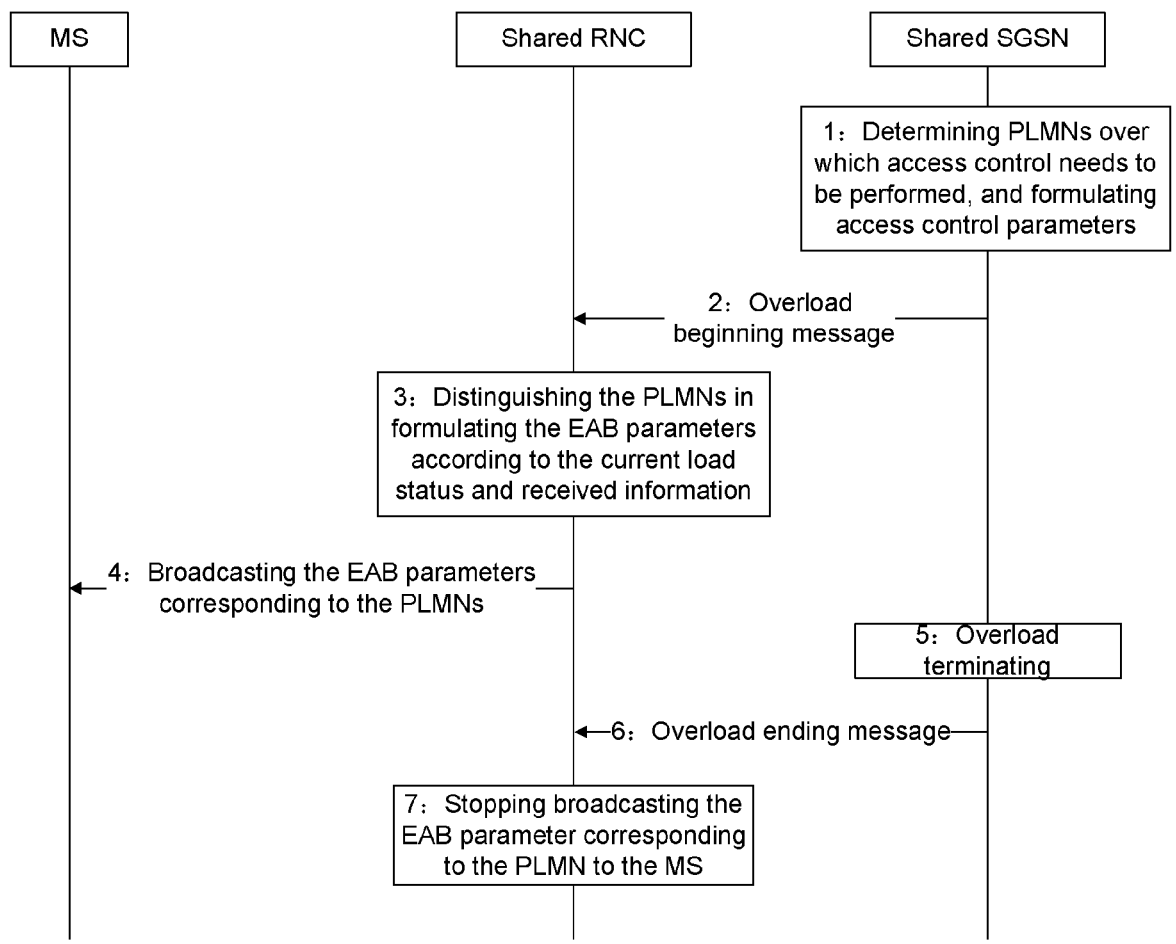
FIG. 3 is one flowchart of performing access control by a shared RNC using the EAB mechanism in a UMTS shared network according to an embodiment of the disclosure.

As shown in FIG. 3, a specific implementation flow of performing access control by a shared RNC using the EAB mechanism in a UMTS shared network is as follows:

1. When a shared SGSN is overloaded, the shared SGSN determines PLMNs over which access control needs to be performed, and optionally formulates corresponding access control parameters;

2. the shared SGSN sends the shared RNC an overload message carrying the identifiers of the PLMNs over which access control needs to be performed and the corresponding access control parameters (optional);

3. the shared RNC formulates a corresponding EAB parameter for each of the PLMNs over which access control needs to be performed according to the current load status and received information;

4. the shared RNC broadcasts the EAB parameters corresponding to the PLMNs over which access control needs to be performed to an MS;

5. the overload status of the shared SGSN terminates, and a load thereof returns to normal;

6. the shared SGSN sends the shared RNC an overload ending message carrying the identifier of a PLMN over which access control is to be stopped; and 7. the shared RNC stops broadcasting the EAB parameter corresponding to the PLMN to the MS.

Embodiment 3

Figure 4:
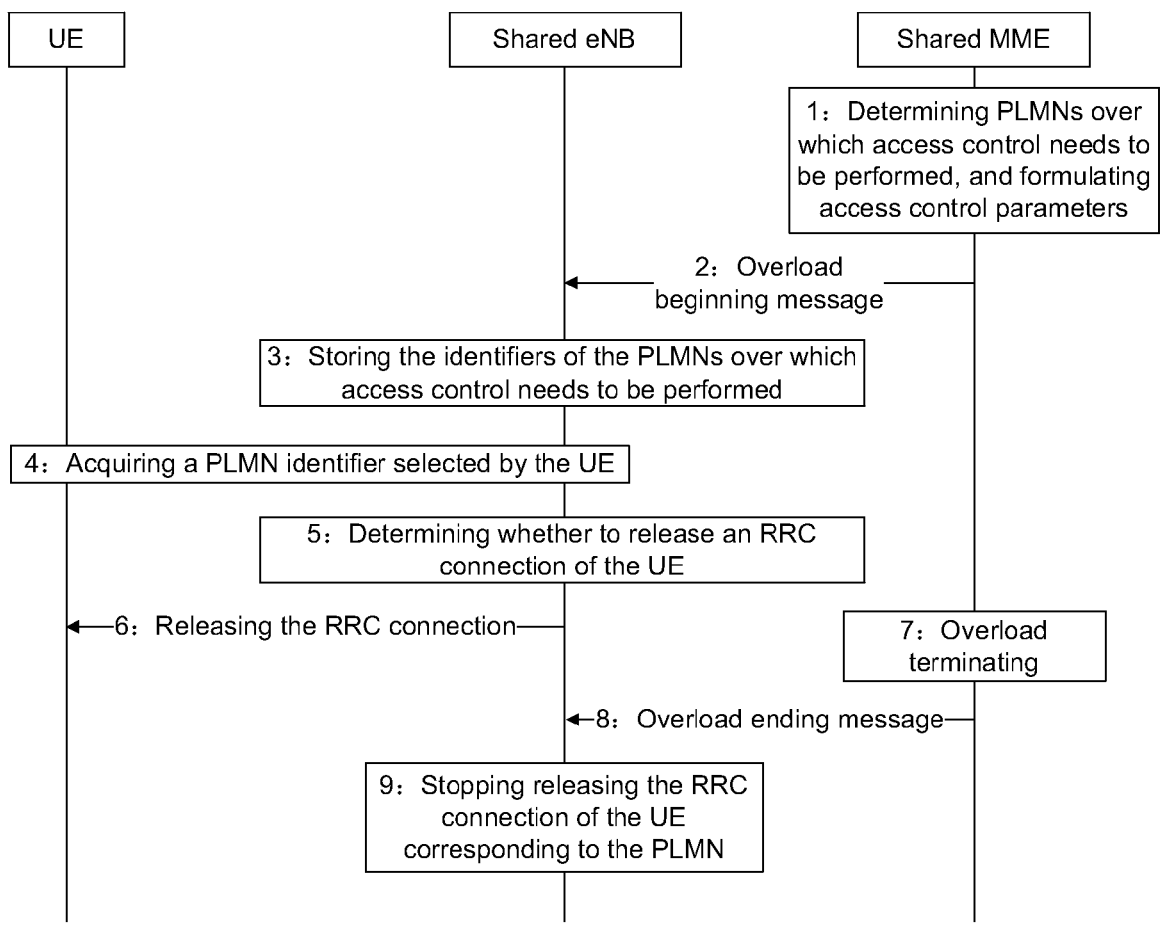
FIG. 4 is one flowchart of performing access control by the shared eNB by releasing a wireless connection of a UE in the EPS shared network according to an embodiment of the disclosure.

As shown in FIG. 4, a specific implementation flow of performing access control by the shared eNB by releasing the wireless connection of the UE in the EPS shared network is as follows:

1. When a shared MME is overloaded, the shared MME determines PLMNs over which access control needs to be performed, and optionally formulates corresponding access control parameters;

2. the shared MME sends the shared eNB an overload beginning message carrying the identifiers of the PLMNs over which access control needs to be performed and the corresponding access control parameters (optional);

3. the shared eNB stores the identifiers of the PLMNs over which access control needs to be performed;

4. the shared eNB acquires a PLMN identifier selected by the UE;

5. if the acquired PLMN identifier selected by the UE is the identifiers of the PLMNs over which access control needs to be performed stored by the shared eNB or is one of them, then the eNB determines to release an RRC connection of the UE;

6. the shared eNB sends an RRC-connection-releasing message to the UE;

7. the overload status of the shared MME terminates, and a load thereof returns to normal;

8. the shared MME sends the shared eNB an overload ending message carrying the identifier of a PLMN over which access control is to be stopped; and 9. the shared eNB stops releasing the RRC connection of the UE corresponding to the PLMN.

Embodiment 4

Figure 5:
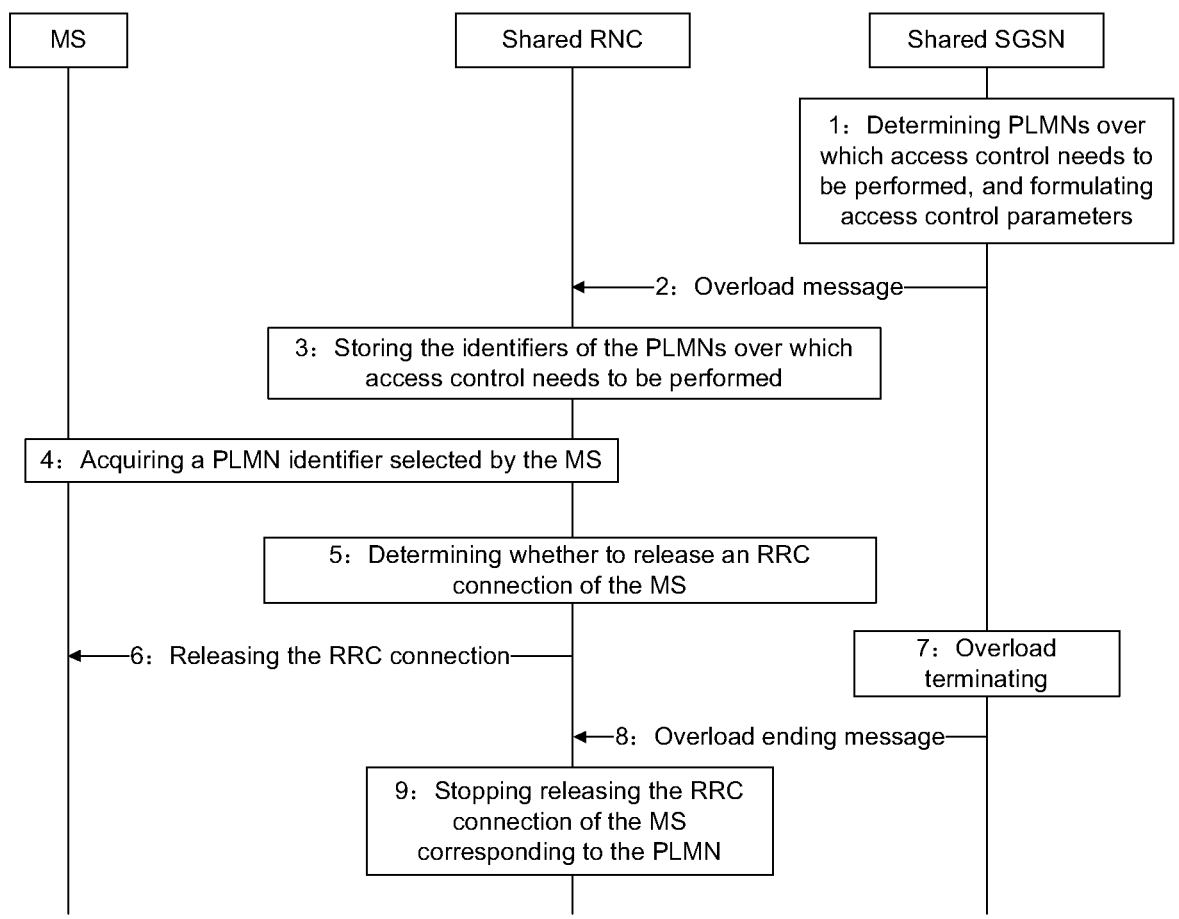
FIG. 5 is one flowchart of performing access control by the shared RNC by releasing a wireless connection of an MS in the UMTS shared network according to an embodiment of the disclosure.

As shown in FIG. 5, a specific implementation flow of performing access control by the shared RNC by releasing the wireless connection of the MS in the UMTS shared network is as follows:

1. When a shared SGSN is overloaded, the shared SGSN determines PLMNs over which access control needs to be performed, and optionally formulates corresponding access control parameters;

2. the shared SGSN sends the shared RNC an overload message carrying the identifiers of the PLMNs over which access control needs to be performed and the corresponding access control parameters (optional);

3. the shared RNC stores the identifiers of the PLMNs over which access control needs to be performed;

4. the shared RNC acquires a PLMN identifier selected by the UE;

5. if the acquired PLMN identifier selected by the MS is the identifiers of the PLMNs over which access control needs to be performed stored by the shared RNC or is one of them, then the RNC determines to release an RRC connection of the MS;

6. the shared RNC sends an RRC-connection-releasing message to the MS;

7. the overload status of the shared SGSN terminates, and a load thereof returns to normal;

8. the shared SGSN sends the shared RNC an overload ending message carrying the identifier of a PLMN over which access control is to be stopped; and 9. the shared RNC stops releasing the RRC connection of the MS corresponding to the PLMN.

A scenario where only the access network is shared

Embodiment 5

Figure 6:
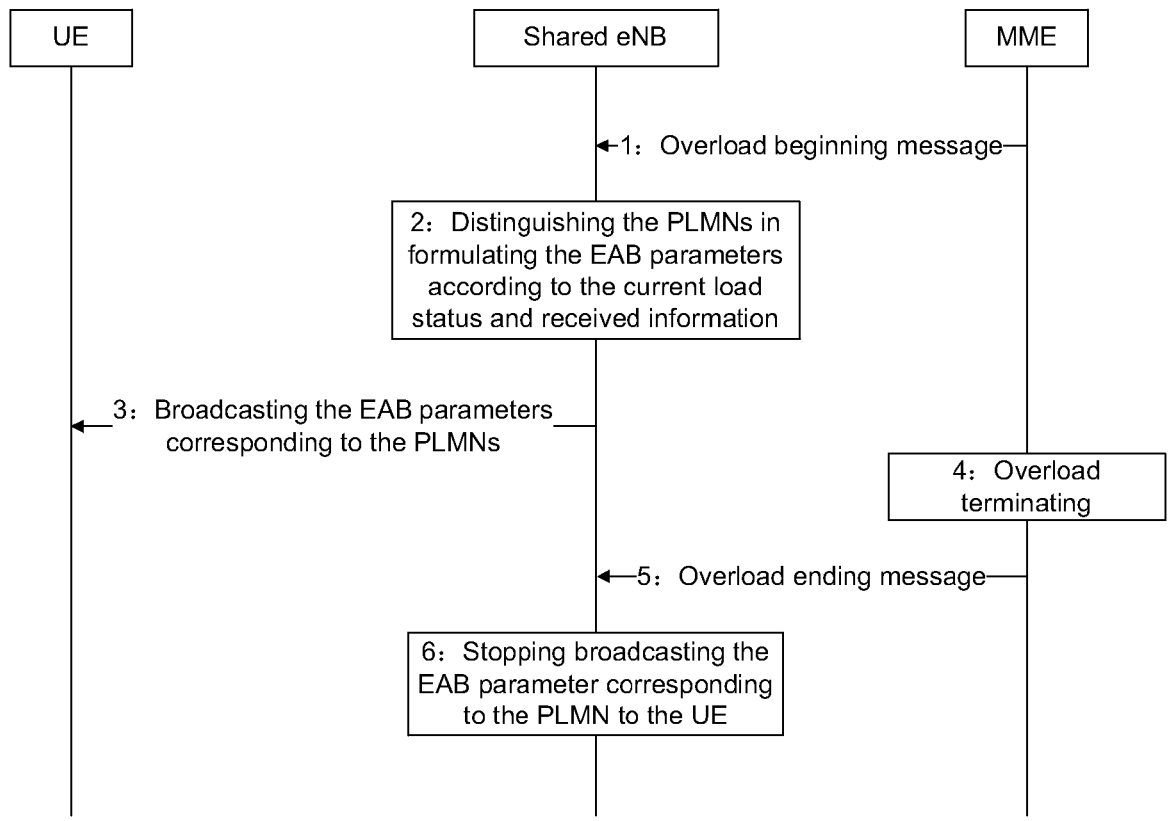
FIG. 6 is another flowchart of performing access control by the shared eNB using the EAB mechanism in the EPS shared network according to an embodiment of the disclosure.

As shown in FIG. 6, a specific implementation flow of performing access control by the shared eNB using the EAB mechanism in the EPS shared network is as follows:

1. When the MME is overloaded, the MME sends an overload beginning message to the shared eNB;

2. the shared eNB determines PLMNs over which access control needs to be performed, and formulates a corresponding EAB parameter for each of the PLMNs over which access control needs to be performed according to the current load status and received information;

3. the shared eNB broadcasts the EAB parameters corresponding to the PLMNs over which access control needs to be performed to the UE;

4. the overload status of the MME terminates, and a load thereof returns to normal;

5. the MME sends an overload ending message to the shared eNB; and 6. the shared eNB stops broadcasting the EAB parameter corresponding to the PLMN to the UE.

Embodiment 6

Figure 7:
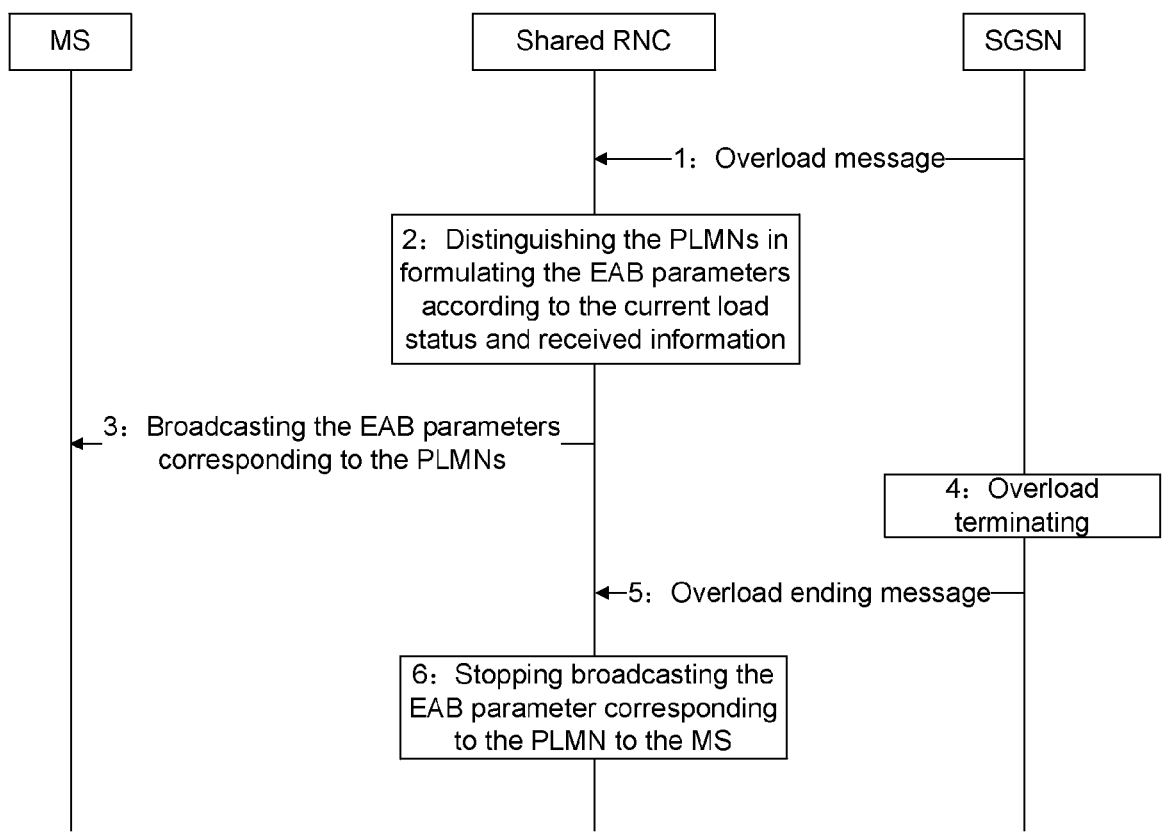
FIG. 7 is another flowchart of performing access control by the shared RNC using the EAB mechanism in the UMTS shared network according to an embodiment of the disclosure.

As shown in FIG. 7, a specific implementation flow of performing access control by the shared RNC using the EAB mechanism in the UMTS shared network is as follows:

1. When the SGSN is overloaded, the SGSN sends an overload message to the shared RNC;

2. the shared RNC determines PLMNs over which access control needs to be performed, and formulates a corresponding EAB parameter for each of the PLMNs over which access control needs to be performed according to the current load status and received information;

3. the shared RNC broadcasts the EAB parameters corresponding to the PLMNs over which access control needs to be performed to the MS;

4. the overload status of the SGSN terminates, and a load thereof returns to normal;

5. the SGSN sends an overload ending message to the shared RNC; and 6. the shared RNC stops broadcasting the EAB parameter corresponding to the PLMN to the MS.

Embodiment 7

Figure 8:
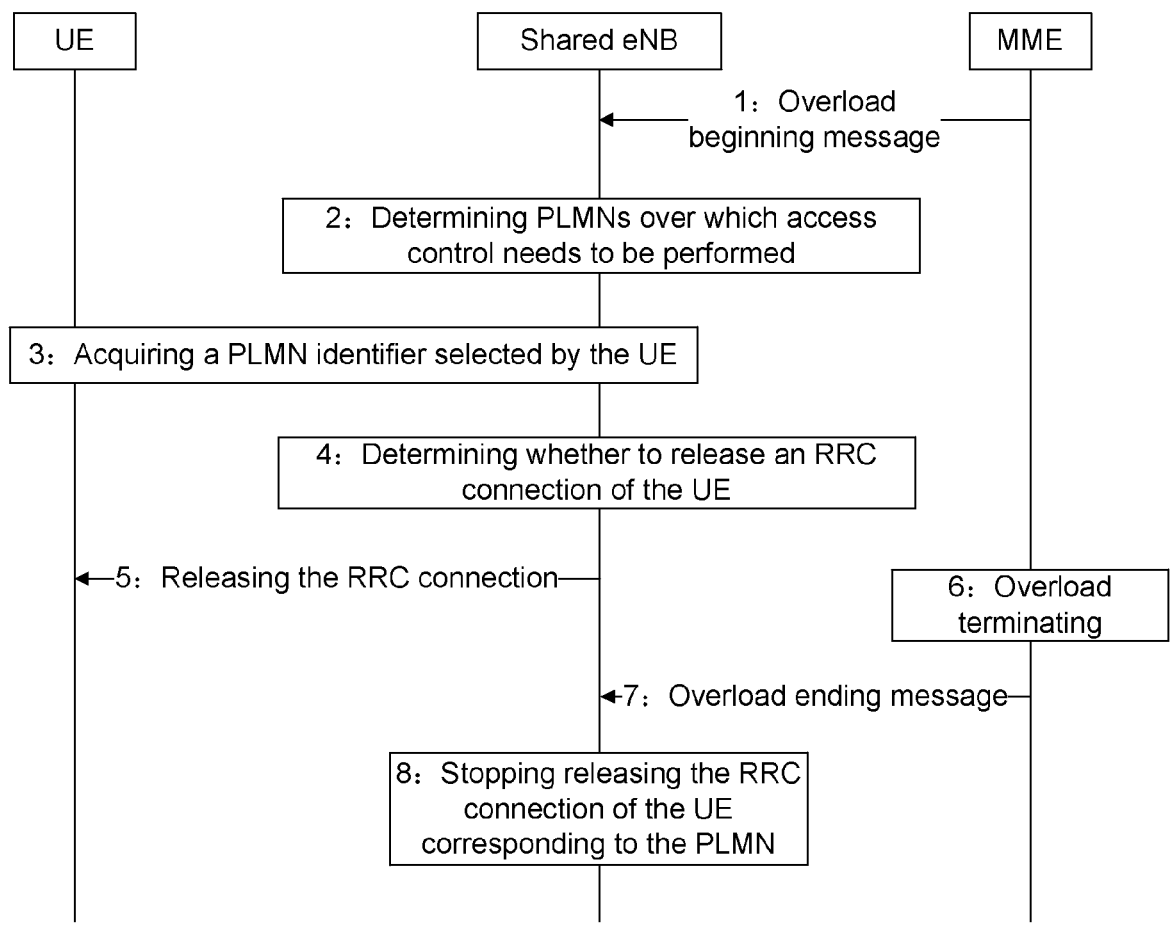
FIG. 8 is another flowchart of performing access control by the shared eNB by releasing the wireless connection of the UE in the EPS shared network according to an embodiment of the disclosure.

As shown in FIG. 8, a specific implementation flow of performing access control by the shared eNB by releasing the wireless connection of the UE in the EPS shared network is as follows:

1. When the MME is overloaded, the MME sends an overload beginning message to the shared eNB;

2. the shared eNB determines PLMNs over which access control needs to be performed according to the current network load status and received information;

3. the shared eNB acquires a PLMN identifier selected by the UE;

4. if the acquired PLMN identifier selected by the UE is the PLMNs over which access control needs to be performed or is one of them, then the eNB determines to release the RRC connection of the UE;

5. the shared eNB sends an RRC-connection-releasing message to the UE;

6. the overload status of the MME terminates, and a load thereof returns to normal;

7. the MME sends an overload ending message to the shared eNB; and 8. the shared eNB stops releasing the RRC connection of the UE corresponding to the PLMN.

Embodiment 8

Figure 9:
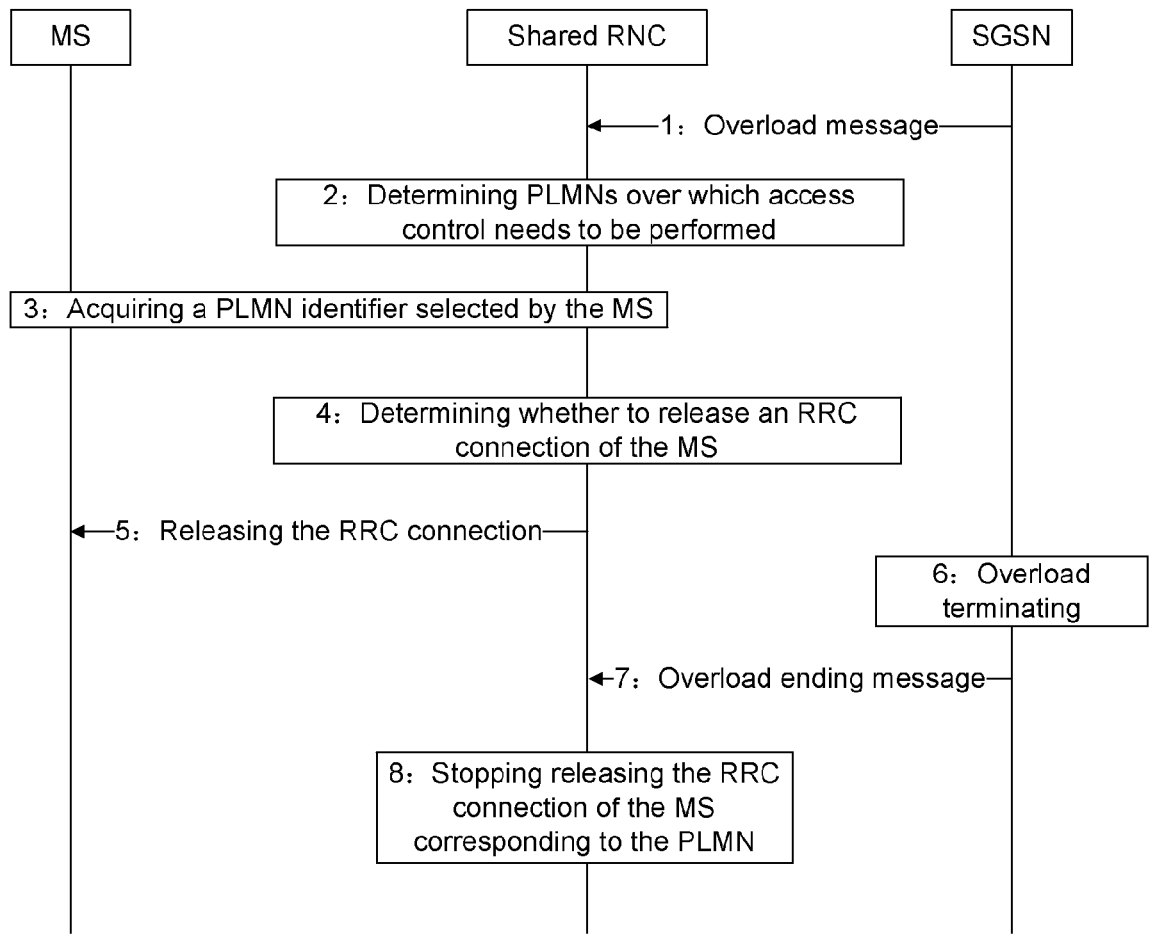
FIG. 9 is another flowchart of performing access control by the shared RNC by releasing the wireless connection of the MS in the UMTS shared network according to an embodiment of the disclosure.

As shown in FIG. 9, a specific implementation flow of performing access control by the shared RNC by releasing the wireless connection of the MS in the UMTS shared network is as follows:

1. When the SGSN is overloaded, the SGSN sends an overload message to the shared RNC;

2. the shared RNC determines PLMNs over which access control needs to be performed according to the current network load status and received information;

3. the shared RNC acquires a PLMN identifier selected by the MS;

4. if the acquired PLMN identifier selected by the MS is the PLMNs over which access control needs to be performed or is one of them, then the RNC determines to release the RRC connection of the MS;

5. the shared RNC sends an RRC-connection-releasing message to the MS;

6. the overload status of the SGSN terminates, and a load thereof returns to normal;

7. the SGSN sends an overload ending message to the shared RNC; and 8. the shared RNC stops releasing the RRC connection of the MS corresponding to the PLMN.

A scenario where only the core network is shared

In the scenario where only the core network node is shared while access network nodes are separate, an overloaded core network node needs to determine PLMNs over which access control is to be performed. The shared core network node sends an overload message to an access network node over which access control needs to be performed. When the overload status of the shared core network node terminates, the shared core network node needs to send an overload stop message to an access network nodes over which access control is being performed.

Note that the role of an indicator such as the overload beginning message and the overload message including the PLMN identifier is to ensure that the access network node can distinguish the PLMNs, such that a PLMN over which access control needs to be performed is determined. It may be seen that, in actual applications, there is no need to limit the overload indicator capable of distinguishing the PLMNs as long as the PLMNs can be distinguished.

Figure 10:
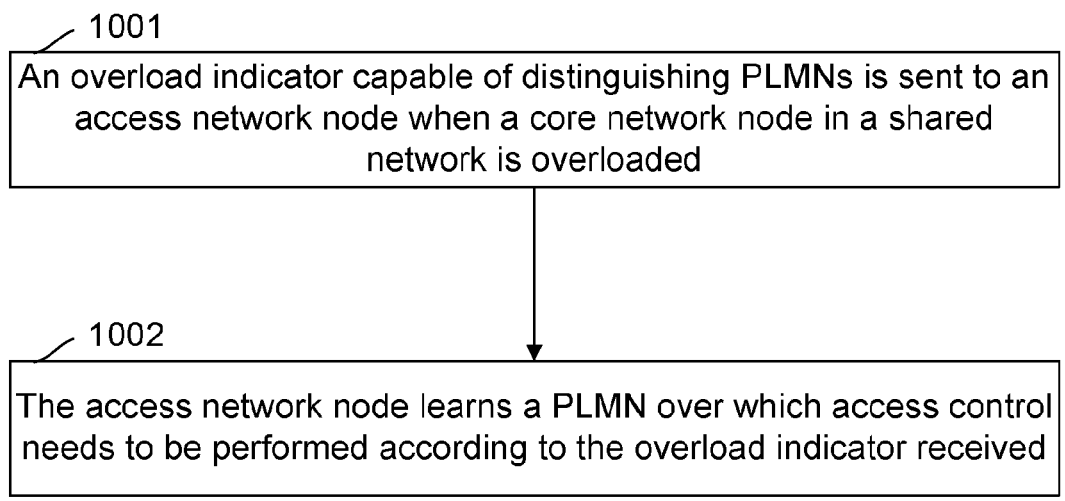
FIG. 10 is a schematic flowchart of controlling access to a shared network according to an embodiment of the disclosure.

As may be seen with reference to various aforementioned embodiments, a mode for controlling access to a shared network of the disclosure may be expressed as a flow shown in FIG. 10, which includes the following steps:

Step 1001: an overload indicator capable of distinguishing PLMNs is sent to an access network node when a core network node in a shared network is overloaded; and Step 1002: the access network node learns a PLMN over which access control needs to be performed according to the overload indicator received.

To sum up, for both the method and the system, the techniques for controlling access to a shared network according to the disclosure distinguish the PLMNs in performing access control according to an actual situation of overload of the network node caused by a PLMN sharing the network, ensuring the fairness in performing access control over all terminals sharing the network. Therefore, the problem of unfairness in performing access control over terminals of different PLMNs in a network sharing scenario is solved.

What described are merely preferable embodiments of the disclosure, and are not intended to limit the scope of protection of the disclosure.

The invention claimed is:

1. A method for controlling access to a network shared by Public Land Mobile Networks (PLMNs), comprising:
   receiving, by an access network node, an overload indicator capable of distinguishing the PLMNs;
   learning, by the access network node, a PLMN over which access control needs to be performed according to the overload indicator received;
   controlling, by the access network node, access by a terminal via the PLMN over which access control needs to be performed;
   wherein the controlling, by the access network node, access by a terminal via the PLMN over which access control needs to be performed is performed in one of the following two modes;
   Mode 1: formulating, by the access network node, an Extended Access Barring (EAB) parameter corresponding to each PLMN over which access control needs to be performed, and sending EAB parameters corresponding to respective PLMNs to a terminal in a broadcast message; and
   Mode 2: acquiring, by the access network node, a PLMN identifier selected by a terminal from a message sent by the terminal, and rejecting a connection establishment request of the terminal or releasing an established connection of the terminal when the PLMN identifier is the identifier of the PLMN over which access control needs to be performed currently.

2. The method according to claim 1, wherein the receiving, by an access network node, an overload indicator capable of distinguishing the PLMNs is:

receiving, by the access network node, the overload indicator capable of distinguishing PLMNs directly from a core network node, when the core network node is overloaded; or receiving, by the access network node, the overload indicator capable of distinguishing PLMNs via an operation and maintenance system, when a core network node is overloaded.

3. The method according to claim 1, wherein the receiving, by an access network node, an overload indicator capable of distinguishing the PLMNs is: receiving, by the access network node, an overload message including a PLMN identifier.

4. The method according to claim 1, further comprising: receiving, by the access network node, an overload stop message carrying an identifier of the PLMN for which access control needs to be stopped, when an overload of a core network node terminates.

5. An access network node for controlling access to a network shared by Public Land Mobile Networks (PLMNs), configured to receive an overload indicator capable of distinguishing the PLMNs;

learn a PLMN over which access control needs to be performed according to the overload indicator received;

control access by a terminal via the PLMN over which access control needs to be performed;

wherein the access network node is configured to control access by a terminal via the PLMN over which access control needs to be performed in one of the following two modes;

Mode 1: the access network node formulates an Extended Access Barring (EAB) parameter corresponding to each PLMN over which access control needs to be performed, and sends EAB parameters corresponding to respective PLMNs to a terminal in a broadcast message; and Mode 2: the access network node acquires a PLMN identifier selected by a terminal from a message sent by the terminal, and rejects a connection establishment request of the terminal or releases an established connection of the terminal when the PLMN identifier is the identifier of the PLMN over which access control needs to be performed currently.

6. The access network node according to claim 5, wherein the overload indicator is received directly from a core network node, when the core network node is overloaded, or wherein the overload indicator is received via an operation and maintenance system, when a core network node is overloaded.

7. The access network node according to claim 5, wherein the overload indicator is an overload message including a PLMN identifier.

8. The access network node according to claim 5, further configured to receive, an overload stop message carrying an identifier of the PLMN for which access control needs to be stopped, when an overload of a core network node terminates.

\* \* \* \* \*